United States Patent
Bentley et al.

(10) Patent No.: US 6,611,760 B2
(45) Date of Patent: Aug. 26, 2003

(54) METHOD AND SYSTEM FOR ESTIMATING GAS PRODUCTION BY A LANDFILL OR OTHER SUBSURFACE SOURCE

(75) Inventors: Harold W. Bentley, Tucson, AZ (US); Gary R. Walter, Tucson, AZ (US); Stewart J. Smith, Tucson, AZ (US); Jinshan Tang, Tucson, AZ (US); Christian T. Williamson, Tucson, AZ (US)

(73) Assignee: Hydro Geo Chem, Inc., Tucson, AZ (US)

( * ) Notice: Subject to any disclaimer, the term of this patent is extended or adjusted under 35 U.S.C. 154(b) by 16 days.

(21) Appl. No.: 10/023,054

(22) Filed: Dec. 14, 2001

(65) Prior Publication Data

US 2003/0114988 A1 Jun. 19, 2003

(51) Int. Cl.[7] .................................................. G01N 7/14
(52) U.S. Cl. ........................................................... 702/2
(58) Field of Search ............................ 702/2, 5, 12, 13; 405/129.5, 129.35, 129.1, 128.15, 128.1, 78, 77, 76

(56) References Cited

U.S. PATENT DOCUMENTS

| | | | | |
|---|---|---|---|---|
| 4,442,901 A | * | 4/1984 | Zison | 166/369 |
| 4,716,758 A | * | 1/1988 | Amantini | 73/38 |
| 5,063,519 A | * | 11/1991 | Zison | 702/47 |
| 6,098,448 A | * | 8/2000 | Lowry et al. | 73/38 |

FOREIGN PATENT DOCUMENTS

| DE | 4323283 | 2/1994 |
|---|---|---|
| DE | 4319976 | 2/1995 |

OTHER PUBLICATIONS

Lu An Hua et al: "Gas–Flow Model to Determine Methane Production at Sanitary Landfills". Environ SCI Technology; Apr. 1981, vol. 15, No. 4, Apr. 1981, pp. 436–440.

Young Alan: "Mathematical modeling of landfill gas extraction"; Journal of Environmental Engineering. Dec. 1989, vol. 115, No. 6, Dec. 1989, pp. 1073–1087.

Poulsen Tjalfe G et al.: "Modeling lateral gas transport in soil adjacent to old landfill"; Journal of Environmental Engineering. Feb. 2001 ASCE, Reston, VA, USA. vol. 127, No. 2, Feb. 2001, pp. 145–153.

(List continued on next page.)

Primary Examiner—Donald E. McElheny, Jr.
(74) Attorney, Agent, or Firm—Lawrence R. Oremland, P.C.

(57) ABSTRACT

A new and useful method and system for estimating LFG generation and gas permeability in a landfill or other subsurface-gas producing body of material is provided. The gas generation rate in a portion of a landfill or other subsurface-gas producing body of material is estimated by obtaining a time history record of atmospheric pressure that is representative of atmospheric pressure at a surface boundary of the portion of the landfill or the subsurface gas producing body of material, measuring the gas pressure at least at one selected location at the landfill (or subsurface body of material) site over a time period that is included in the time history record, and using the atmospheric pressure and the measured gas pressure over the time period to estimate LFG generation rate and gas permeability of the portion of the landfill or the subsurface gas producing body of material. In a preferred embodiment, gas pressure is measured at a plurality of selected locations within the refuse portion of a landfill, and in the case of an unlined landfill in the supporting soil below the landfill, and the measured pressures are used to estimate LFG generation rate and gas permeability of the landfill.

20 Claims, 2 Drawing Sheets

OTHER PUBLICATIONS

Arigala Sumadhu G et al: "Gas generation, transport, and extraction in landfills"; Journal of Environmental Engineering. Jan. 1995 ASCE, New York, NY, USA. vol. 121, No. 1, Jan. 1995; pp. 33–44.

Al–Hussainy, R., H.J. Ramey, Jr., and P.B. Crawford, 1966. "The Flow of Real Gases Through Porous Media." Journal of Petroleum Technology, vol. 237, pp. 624–636.

Carslaw, H.S. and J.C. Jaeger, 1959. "Conduction of Heat in Solids." Oxford University Press, Oxford, England, pp. 105–106.

Hantush, M.S., 1964. "Hydraulics of Wells in Advances in Hydroscience." vol. I., V.T. Chow Ed., Academic Press, New York, pp. 334–335.

Lu, N. 1999. Time–series analysis for determining vertical air permeability in unsaturated zone. J. Geotechnical and Environmental Engineering. Jan., pp. 67–69.

Rojstaczer, S. and J. Turk. 1995. Field–based determinations of air diffusivity using soil air and atmospheric pressure time series. Water Resources Research. vol. 31, 3337–3343.

Joseph Rossabi and Ronald W. Falta. "Analytical Solution For Subsurface Gas Flow to a Well Induced by Surface Pressure Fluctuations." vol. 40, No. 1 —Ground Water — Jan.–Feb. 2002 (pp. 67–75).

Chao Shan. "Analytical solutions for determining vertical air permeability in unsaturated soils." Water Resources Research, vol. 31, No. 9, pp. 2193–2200, Sep. 1995.

Weeks, Edwin P. 1978. "Field determination of vertical permeability to air in the unsaturated zone." U.S. Geological Survey Professional Paper 1051, pp. 1–39.

"Barometric pumping effects on soil gas studies for geological and environmental characterization", D.E. Wyatt, D.M. Richers, R.J Pirkle, Environmental Geology (1995), pp. 243–250.

"An examination of temporal/spatial variations in landfill–generated methane gas", E.A. McDean and G.J. Farquhar, Water, Air and Soil Pollution 13 (1980), pp. 157–172.

"The effects of fluctuations in atmospheric pressure on landfill gas migration and composition", Alan Young, *Water, Air, and Soil Pollution* 64, pp. 601–616, 1992.

"Time–dependent modeling of soil–gas flow rates", Andrew Cripps, *Environment International*, vol. 22, Suppl. 1, pp. S499–S507, 1996.

"The effects of barometric pumping on contaminant transport", L.H. Auer, N.D. Rosenberg, K.H. Birdsell, E.M. Whitney, *Journal of Contaminant Hydrology* 24 (1996), pp. 145–166.

"Ambient monitoring program to evaluate VOC emissions from landfill waste relocation activities." Stock, Donald B., O'Brien, Michael V., Chock, Gregory M., Pacy Analytical Services, Inc., Minneapolis, MN, USA. Proc., Annu. Meet. ——Air Wast Manage. Assoc. (1996), $89^{th}$ fa15901/1–fa15901/16. Coden: Pamee5 ISSN: Caplus (Copyright 2001 ACS), Abstract only.

"Understanding natural and induced gas migration through landfill cover materials —The basis for improved landfill gas recovery," Bogner, 1986 *American Chemical Society*. pp. 199–204.

* cited by examiner

METHOD AND SYSTEM FOR ESTIMATING GAS PRODUCTION BY A LANDFILL OR OTHER SUBSURFACE SOURCE

TECHNICAL FIELD

The present invention provides a method and system for estimating the rate of gas production by a landfill or other subsurface body of material in which a gas flow is generated. It also provides a method for estimating the effective gas permeability of a gas generating landfill.

BACKGROUND

Estimation of the rate of landfill gas (LFG) generation is required for calculation of non-methane organic compound (NMOC) emissions under current US law, for successful design of LFG collection systems for LFG-to-energy projects, and for other LFG control systems. With respect to NMOC emissions, United States regulations allow a landfill owner to calculate emissions using a tiered approach based on estimates and/or measurements of LFG generation and NMOC concentrations within the landfill. Tiers 1 and 2 utilize a formula for LFG generation that is based in part on the size and age of the landfill and that does not involve direct measurement of LFG. Because this formula is designed to be conservative, estimates of LFG generation by this method are likely to be higher than the actual rate, especially for landfills in arid environments where low refuse moisture content may limit LFG generation. Tier 3 involves measurements from which the LFG generation rate is calculated. Similar measurement and estimation methods are typically employed to estimate LFG generation rates when designing LFG-to-energy projects and LFG control systems.

The Tier 3 methodology is generally not employed for calculation of NMOC emissions unless calculations by Tier 1 and 2 methods indicate that the NMOC emissions exceed 50 megagrams per year (MG/yr). United States regulations require the landfill owner to install an LFG control system unless the NMOC emissions calculated by Tiers 1, 2, or 3 are less than 50 MG/yr. Operation of the control system is then required until NMOC emissions drop below 50 MG/yr, which will occur eventually for a closed landfill as it ages. Periodic recalculation of NMOC emissions is required, however, to demonstrate that emissions are below this threshold, resulting in additional expense. The Tier 3 methodology is time consuming and expensive, and, as described below, does not provide a reliable estimate of the LFG generation rate or NMOC emission rate. Overestimation of LFG generation by any of these methods is costly to the landfill operator if it results in estimated NMOC emissions greater than 50 MG/yr and requires the installation of an LFG control system. Over- or under-estimation of the LFG generation rate is also costly if it results in an over- or under-designed LFG collection or control system.

The Tier 3 method involves extracting gas from a well or cluster of wells completed in landfilled materials and measuring pressure drawdown in monitoring probes completed at various depths and distances from the extraction well(s) to determine the extraction wells' "radius of influence" (ROI). The Tier 3 ROI is typically taken to be the distance at which no measurable pressure drawdown occurs. Pressure drawdown is defined as the difference between "average static pressure" in the landfill measured prior to gas extraction and the average pressure measured during extraction. Average pressures are used in an attempt to remove the influence of atmospheric pressure fluctuations on the measurements. The assumption is made that the "average static pressure" is determinable as a reference pressure to calculate pressure drawdown after extraction begins. FIG. 1, a generalized plot of pressure versus distance from an extraction well, illustrates some of the measurements associated with the Tier 3 methodology. The pressure drop, or "influence" at a given distance from the extraction well is defined as:

$$I = \bar{P}_0 - \bar{P}_e \quad (1)$$

where $\bar{P}_0$ is the average static absolute pressure 101 (see FIG. 1) and $\bar{P}_e$ is the average extraction absolute pressure 102 (see also FIG. 1)

As further seen in FIG. 1, the ROI 103 may be determined directly as the distance from the extraction well at which the measured $I \leq 0$ (within measurement error 104) or by extrapolating the measured I values using a semi-logarithmic regression. The accuracy of the pressure measurements is specified to be $\pm 0.02$ mm of mercury or $4 \times 10^{-4}$ pounds per square inch (psi).

Gas samples are also collected during extraction from the extraction well and monitoring probes and analyzed for nitrogen to determine whether leakage of atmospheric air into the landfill from the surface is contributing significantly to the flow to the extraction well(s). Nitrogen concentrations in excess of 20% are taken to indicate excess surface leakage. If surface leakage is not indicated by gas analysis or by negative gauge pressures in shallow monitoring probes, then the rate of gas extraction by the well(s) is assumed to be equal to the rate of LFG generation within the volume of landfill materials encompassed by the ROI. Landfill materials outside the ROI are not considered to contribute to gas flow to the extraction well.

The Tier 3 methodology rests entirely on the assumption that the gas extraction rate equals the LFG generation rate within the volume of the refuse between the extraction well and the ROI. This assumption is inconsistent with fundamental principles of gas flow to wells. To illustrate this point, assume that the LFG generation rate is uniform throughout the landfill and that the effective gas permeability of the refuse is much larger than the gas permeability of the cover so that the vertical pressure gradient in the refuse is negligible. In this case, the average difference in pressure between refuse and the atmosphere due to flow through the cover is given simply by Darcy's Law (Al'Hussainy and others, 1966):

$$q_{LFG} = \frac{k_c}{\mu} \frac{\Delta P_0}{b_c} \quad \text{or} \quad (2)$$

$$\Delta P_0 = \frac{q_{LFG} \mu b_c}{k_c} \quad (3)$$

where $q_{LFG}$ is the gas generation rate unit area of landfill $k_c$ is the effective gas permeability of the cover $\mu$ is the dynamic viscosity of the LFG $b_c$ is the cover thickness $\Delta P_0$ is the pressure differential $P_0 - P_a$ $P_a$ is the atmospheric pressure $P_0$ is the pressure in the refuse.

Given the assumption of a uniform LFG generation rate and an areally extensive landfill, the static pressure in the refuse is $$\bar{P}_0 = \bar{P}_a + \Delta P_0 \quad (4)$$

where $\bar{P}_a$ is the average atmospheric pressure. Given the assumptions above, $\bar{P}_0$ is uniform throughout the landfill.

For small pressure differentials, the pressure drop created by an extraction well (assuming an ideal gas and steady-flow conditions and ignoring compressibility effects) is given by:

$$\Delta P_e = \frac{-Q_e \mu}{2\pi k_r b_r} P_D \quad (5)$$

where $k_r$ is the effective horizontal gas permeability of the refuse, $Q_e$ is the well extraction rate, $P_D$ is an appropriate dimensionless pressure solution for flow to the well, $\Delta P_e$ is the difference between static and flowing pressure, and $b_r$ is the thickness of the refuse.

For the case of a well fully penetrating a highly permeable refuse in a lined landfill with a relatively low permeability cover, the appropriate $P_D$ function is that given by Hantush (1964) for a leaky, confined formation without fluid storage in the confining bed:

$$P_D = K_0(r/B); B = \left(\frac{k_r b_r b_c}{k_c}\right)^{1/2} \quad (6)$$

where $K_0$ is the modified Bessel function of zero order.

Thus, equation (5) becomes $$\Delta P_e = \frac{-Q_e \mu}{2\pi k_r b_r} K_0(r/B) \quad (7)$$

The average absolute pressure within the refuse during extraction is then $$\overline{P}_e = \overline{P}_0 + \Delta P_e \quad (8)$$

The generalized absolute pressure in the refuse 102 based on (7) is illustrated in FIG. 1 along with its relationship to the static pressure 101. In the Tier 3 methodology, the ROI 103 is defined as the radial distance from the extraction well at which the difference between the absolute pressure during extraction and the static absolute pressure is zero, that is, $$\overline{P}_0 - \overline{P}_e = 0 \quad (9)$$

within measurement error 104. Using the Tier 3 criteria, the following assumption is made:

$$\Delta P_e \cong 0 = \frac{-Q_e \mu}{2\pi k_r b_r} K_0(r_e/B) \quad (10)$$

where $r_e$ is the radius of influence.

Equations (8) and (10) and FIG. 1 illustrate two problems with the Tier 3 approach. First, although the pressure drop induced by the extraction well approaches zero as r increases ($K_0 \to 0$ as $r \to \infty$), it never actually reaches zero and the radius of influence depends on the measurement error. The larger the error, the less the radius of influence and vice-versa. Second, and more importantly, the LFG generation rate plays no role in equation (7) so that the distance ($r_e$) at which $\Delta P_e$ is zero within measurement error is independent of the LFG generation rate. Therefore, the LFG generation rate cannot be determined using the Tier 3 methodology.

Additional analysis of the "radius of influence" (i.e. Tier 3) methodology, as well as other LFG collection methodologies is provided by U.S. Pat. No. 5,063,519. The '519 patent offers as a solution a methodology in which measurements of the effective gas permeability of the landfill cover soil are made independent of the landfill gas pressure measurements by determining soil permeability from soil samples that are collected over the time period of the test. In the '519 patent the tester is advised to avoid inserting the probe (pressure measuring device) into the refuse portion of the landfill. The tester uses the permeabilities and their spatial variability, the pressure data and its spatial variability, and other data to calculate the cumulative frequency distribution of LFG flow through the landfill surface. Moreover, in the methodology of the '519 patent, it is assumed that all of the gas generated within the landfill leaves the landfill through the soil cover (except for that which may be extracted by wells).

SUMMARY OF THE PRESENT INVENTION

The present invention provides a new and useful method and system for estimating LFG generation in a way that is relatively inexpensive, efficient to perform, and which is designed to improve the accuracy of the gas generation estimate.

With the present invention, the landfill conditions that require a landfill operator to install an LFG control system can be more accurately estimated than with the Tier 3 methodology, thus minimizing the likelihood that an LFG control system will be unnecessarily required for the landfill. In the case of a LFG-to-Energy project, the energy production potential of the landfill can be more accurately estimated and the profitability of the project can be enhanced.

Moreover, unlike the methodology of the '519 Patent, the methodology of the present invention uses the atmospheric and landfill pressures to estimate both the landfill permeability and the LFG generation rate, rather than requiring soil samples to be collected and analyzed to determine soil permeability (as in the '519 patent). Additionally, whereas the methodology of the '519 patent assumes that all of the gas generated within the landfill leaves the landfill through the soil cover (except for that which may be extracted by wells), and requires that the gas pressure measurements be taken from the soil cover (but not the gas generating refuse), the methodology of the present invention recognizes that in the case of unlined landfills, some of the gas will leave the landfill through the soil which supports the landfill and provides gas pressure measurements that are taken within the refuse portion of the landfill, and under certain conditions in the supporting soil below or to the side of the gas generating refuse portion of the landfill.

According to the present invention, the gas generation rate in a portion of a landfill is estimated by obtaining a time history record of atmospheric pressure that is representative of atmospheric pressure at a surface boundary of the landfill, measuring the gas pressure at least at one selected subsurface location at the landfill site over a time period that is included in the time history record, and using the atmospheric pressure and the measured gas pressure over the time period to estimate the LFG generation rate of the portion of the landfill.

In a preferred embodiment, gas pressure is measured at a surface boundary of the landfill and at a plurality of selected locations within the gas generating refuse portion of the landfill, and in the case of an unlined landfill in the supporting soil below (and in some cases on the side of) the landfill, and the measured pressures are used to estimate the LFG generation rate of the landfill.

The invention recognizes that the rate of landfill gas generation from a landfill, e.g. a municipal solid waste landfill, can be determined with reasonable engineering accuracy by measuring gas pressure within and at the surface of the landfill (and in the case of an unlined landfill gas pressure below and to the side of the landfill) and analyzing its response to changes in atmospheric pressure.

Moreover, the principles of the present invention can be used to estimate the gas permeability of a portion of a gas generating landfill independent of determining the gas generation rate.

Other features of the present invention will become apparent from the following detailed description and the accompanying drawings.

DETAILED DESCRIPTION

Figure 1:
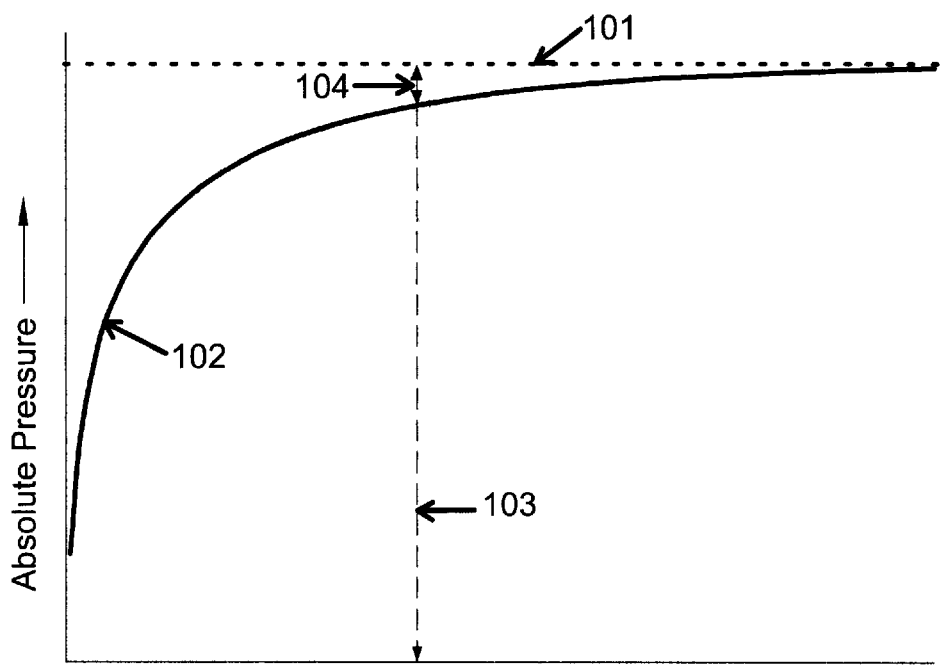
FIG. 1 is a generalized plot of pressure versus distance from a single extraction well, and which is discussed above in connection with the limitations of Tier 3 methodology.

As described above, the present invention is particularly useful in estimating landfill gas (LFG) generation rate, and its principles are described below in connection with estimation of LFG generation rate. With the principles of the present invention in mind, the manner in which those principles can also be applied to estimating the gas generation from other subsurface bodies of material in which a gas flow originates will be apparent to those skilled in the art.

Initially, it is useful to describe the theory underlying the present invention. Specifically, the invention recognizes that the rate of landfill gas generation from a landfill, e.g. a municipal solid waste landfill, can be determined with reasonable engineering accuracy by measuring gas pressure within and at the surface of the landfill and, in the case of unlined landfills, the gas pressure in the supporting soil below the landfill (and in some cases to the side of the landfill), and analyzing its response to changes in atmospheric pressure. The gas pressure at a given depth and location within a landfill that contains organic matter that is undergoing biological or chemical conversion to gas is determined by Darcy's Law:

$$\vec{q} = -\frac{\bar{\bar{k}}_e}{\mu}(\nabla P + \rho g \vec{n}) \tag{11}$$

where $\vec{q}$ is the gas volumetric flux vector, $\bar{\bar{k}}_e$ is the effective gas permeability tensor, P is the pressure at a point in the refuse, $\mu$ is the gas dynamic viscosity, $\nabla$ is the gradient operator, $\rho$ is the gas density, g is the gravitational acceleration, and $\vec{n}$ is the unit normal vector directed downward.

Although the effective gas permeability, viscosity, and density are dependent on temperature, pressure, and gas composition, in many practical situations at landfills, these parameters can be treated as constants for the purpose of estimating the LFG generation rate. If greater accuracy is required, mathematical models that account for the variation in gas properties can be used.

Based on equation (11), the average pressure in a landfill (corrected for elevation of the pressure measuring point) that is generating LFG will be greater than average atmospheric pressure. Equation (11) also implies that the rate of LFG generation can be computed based on measurements of the difference between atmospheric pressure and pressure in the landfill if the effective gas permeability and porosity are known or can be reasonably estimated. Performing such an analysis is complicated, however, by the fact that atmospheric pressure is constantly changing. Furthermore, the changes in atmospheric pressure propagate through the landfill cover, refuse, and surrounding soil causing the gas pressure in the refuse to vary from its average value. The variation of the landfill internal pressure at a given location due to changes in atmospheric pressure depends on the effective gas permeability and gas-filled porosity of the cover, refuse, and surrounding soil as wells as on the dimensions and shape of the landfill.

The effect of the gas permeability and gas-filled porosity on the internal pressure response can best be illustrated by considering the ideal situation of the pressure response in the center of a very large landfill in which the permeability and porosity are uniform with depth. In this idealized case, the pressure response can be approximated by assuming that the gas flow takes place only in the vertical dimension. If the upper boundary of the flow domain is the land surface and the lower boundary is impervious to gas flow (such as a water table or landfill liner), the atmospheric pressure varies in a simple, harmonic manner, and ignoring early transient terms, then the internal pressure is given by an analogous heat flow equation derived from Carslaw and Jaeger (1959 p. 105, equation (1)):

$$P^2(z) = A(z)\sin(\omega t + \epsilon + \theta(z)) + \overline{P_0^2}(z) \tag{12}$$

where

A(z) is the amplitude of the pressure variation at depth z, $\omega$ is the frequency of the atmospheric pressure variation, $\epsilon$ is the phase of the atmospheric pressure variation, z is the depth, $\overline{P_0^2}$ is the average internal pressure squared.

$\theta$ is the phase lag at depth z, and

The amplitude, A(z), of the pressure squared variation at depth z is given by $$A(z) = A_0 \left[ \frac{\cosh\left[\left(\frac{2\omega}{\alpha}\right)^{\frac{1}{2}} z\right] + \cos\left[\left(\frac{2\omega}{\alpha}\right)^{\frac{1}{2}} z\right]}{\cosh\left[\left(\frac{2\omega}{\alpha}\right)^{\frac{1}{2}} L\right] + \cos\left[\left(\frac{2\omega}{\alpha}\right)^{\frac{1}{2}} L\right]} \right]^{\frac{1}{2}} \tag{13}$$

where $A_0$ is the amplitude of the atmospheric pressure squared variation, L is the depth of the lower impervious boundary, and α (pneumatic diffusivity) is defined as $$\alpha = \frac{k_e \overline{P_a}}{\phi \mu} \quad (14)$$

where φ is the gas-filled porosity and $\overline{P_a}$ is the average atmospheric pressure at the landfill site. The phase lag at depth z, θ(z), is given by:

$$\theta(z) = \arg\left[\frac{\cosh[(\omega/(2\alpha))^{1/2}z(1+i)]}{\cosh[(\omega/(2\alpha))^{1/2}L(1+i)]}\right] \quad (15)$$

where i is $(-1)^{1/2}$ and arg is the argument of the complex number in brackets in equation (15). Although less accurate, equation (12) can also be written in terms of pressure rather than pressure squared.

Equations (12) through (15) indicate that the pressure response at depth z depends on the pneumatic diffusivity of the soil, that the amplitude of the pressure response at depth z is attenuated with respect to that of the atmospheric pressure wave as a function of $k_e/\phi$, and that the pressure wave at depth z lags behind the pressure wave at the land surface as a function of $k_e/\phi$. To the extent that atmospheric pressure variations can be approximated by a simple harmonic function, analytical equations such as (12) through (15) can and have been used to estimate the pneumatic diffusivity of soils and other naturally occurring subsurface materials (e.g. Weeks, 1978; Rojstaczer and Turk, 1995; Lu, 1999). They have not, to the inventors' knowledge, been applied to landfills. Given a reasonable estimate of the soil and refuse gas-filled porosity, the effective gas permeability can then be estimated from the pneumatic diffusivity. If the difference between the average internal pressure and the average atmospheric pressure is also determined, then the LFG generation rate per unit area can be computed from equation (2).

Although equations such as (12) through (15) illustrate the general principles behind estimating the LFG generation rate from the atmospheric pressure response, real world conditions are rarely as simple as those assumed in deriving and applying these equations. First, atmospheric pressure varies in response to a number of factors and cannot generally be described by simple harmonic functions. In addition, the pressure response in a landfill depends on the soil and refuse pneumatic properties, which are not uniform in space. The pressure response also depends on the geometry of the landfill and the location of the pressure measurement points. Finally, the difference between the average internal pressure and the average atmospheric pressure is difficult to accurately determine because both pressures are constantly changing. These complexities will usually require the use of a numerical model to derive the effective gas permeability and LFG generation rate from the measured atmospheric pressure and subsurface pressure response.

Given a suitable mathematical model (whether analytical or numerical) for computing the subsurface pressure whose inputs include the effective gas permeability, gas-filled porosity, landfill gas generation rate, landfill geometry, and atmospheric pressure versus time as a boundary condition, the LFG generation rate and effective gas permeability can be estimated by computing the subsurface pressure response for assumed values of the effective gas permeability, gas-filled porosity, and LFG generation rate and comparing the computed pressure response to the measured pressure response. The actual values of effective gas permeability, gas-filled porosity and LFG generation rate can be estimated by adjusting their input values so as to minimize the difference between the computed and measured pressures. This adjustment process can be performed manually by trial and error or by using various automatic parameter estimation methods.

A suitable mathematical model would solve a partial differential equation based on Darcy's Law for gas flow and the continuity equation. One formulation of such a partial differential equation is:

$$\nabla \cdot \frac{-\overline{\overline{k_e}}\rho}{\mu}(\nabla P + \rho g \vec{n}) = \phi \frac{\partial \rho}{\partial t} + \rho \dot{Q} \quad (16)$$

where $\dot{Q}$ is the volumetric rate of gas generation per unit volume of the porous media, $\overline{\overline{k_e}}$ is the effective gas permeability tensor, P is the pressure at a point in the subsurface body of material, ∇ is the gradient operator, ρ is the gas density, g is the gravitational acceleration, φ is the gas-filled porosity, μ is the dynamic viscosity of the subsurface body of material, $\vec{n}$ is the unit normal vector directed downward, t is time, and the terms $k_e$, μ, and ρ are dependent on the temperature, pressure, and gas composition.

Various simplifications to equation (16), such as but not limited to assuming that $k_e$, μ, and ρ are constant, are also possible depending on the circumstance at the site and the desired level of accuracy. Those parameters may also be assumed to be independent of temperature, pressure or gas composition, in which case they would be treated as constants in equation (16). Another such simplification is to eliminate the density term in (16) by using the Ideal Gas Law or various adjustments to the Ideal Gas Law for real gases to express equation (16) in terms of pressure or pressure squared. These simplifications will be apparent to those skilled in the art. When coupled with boundary conditions describing the variation of atmospheric pressure at the land surface, solutions to equations based on equation (16) provide the basis for determining the LFG generation rate and effective gas permeability solely from the measurements of atmospheric pressure and subsurface pressure response using the modeling and parameter estimation procedures described above.

Figure 2:
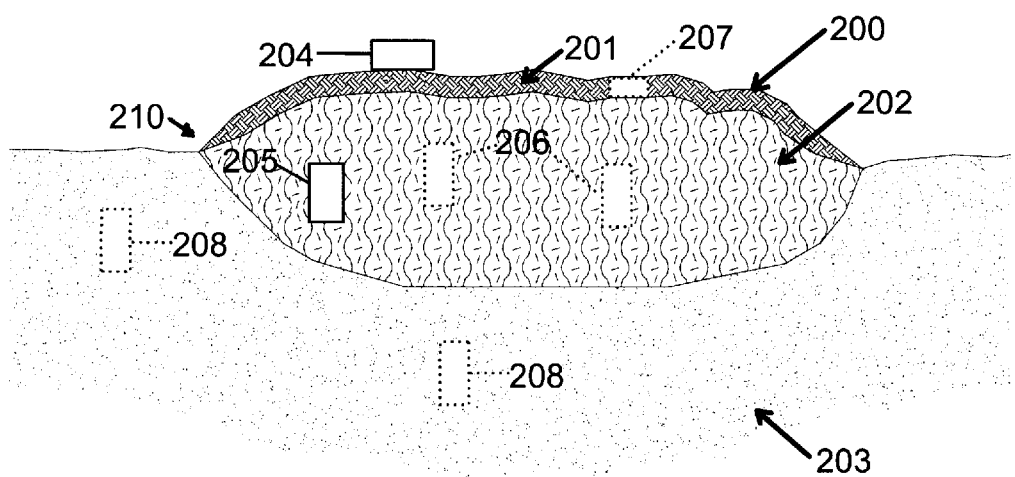
FIG. 2 is a schematic illustration of a landfill with which the principles of the invention are used to estimate the gas generation rate.

In FIG. 2, a landfill 200 is shown schematically in cross-section at a landfill site 210. The landfill 200 comprises a soil cover 201 and a landfilled body of gas generating refuse 202 below the soil cover 201. Supporting soil 203 is located below and on the side(s) of the landfilled body of gas generating refuse 202. A sensor 204 senses atmospheric pressure at an upper boundary of the landfill. A time history record of atmospheric pressure that is representative of atmospheric pressure at a surface boundary of the landfill can also be obtained from atmospheric measurements obtained at a meteorological station and extrapolated to the landfill site.

In the embodiment of FIG. 2, a gas pressure sensor 205 is located selected site in the refuse portion 202 of the landfill in which the LFG generation rate is to be measured. An equivalent gas pressure measurement can be provided by locating a sensor at the surface of the landfill and connecting it by tube or pipe to a gas-pervious implant located at 205. One or more additional sensors or implants 206 may be provided at selected locations within the landfill (i.e. within the refuse portion 202 of the landfill), and sense the pressure at those locations. One or more sensors or implants 207 may be located within the landfill cover 201. If the landfill is unlined, one or more sensors or implants 208 may be provided in the supporting soil 203 outside the landfill (e.g. in the illustrated example the supporting soil 203 comprises the soil below and beside the refuse portion 202 of the landfill). The measured pressures of all subsurface sensors or implants are used to estimate the landfill gas generation rate.

Additionally, while the example of FIG. 2 shows at least one sensor or implant 205 located in the refuse portion 202 of the landfill, if the landfill is unlined, the principles of the present invention can be used to estimate the LFG generation rate only with sensors or implants located in the supporting soil (e.g. only with sensors or implants such as shown at 208 in FIG. 2).

In applying the method of the invention, the measurements of atmospheric pressure must be made over a period of time of sufficient length to include at least one daily atmospheric pressure maximum or one atmospheric pressure minimum. That measurement should create a time history record of atmospheric pressure representative of that at the upper boundary of the landfill. The time history record of atmospheric pressure need not be continuous but could be composed of multiple, discontinuous periods during which the atmospheric pressure is measured. The accuracy of the estimate of LFG generation rate is improved if the measurements are made over a period of at least two days. The pressure measurements can be made using a variety of means including fluid manometers, mechanical pressure gages, and electronic pressure gages. The required precision of the pressure-measuring device is determined by the rate of LFG generation, and the effective gas permeability of the refuse, cover, and surrounding soil, and the range of atmospheric pressure variations. In general, the atmospheric pressure and subsurface pressure should be measured so as to detect a difference of ±0.001 pounds per square inch or less. Accuracy of the method is decreased if the error in measuring the difference between atmospheric and subsurface pressure is greater than 0.001 pounds per square inch. The subsurface pressure measurements can be made either by placing the pressure measuring device at the desired location in the subsurface or by connecting a pressure measuring device at the land surface to the subsurface location with a tube or pipe. The subsurface pressure measurements are performed over a time period that is included in the time history record of the atmospheric pressure. After the pressure measurements are made according to the method described above, the LFG generation rate is estimated by analyzing these measurements using a suitable mathematical model as described above (e.g. as described at pages 11, 12 with respect to equation (16)).

Figure 3:
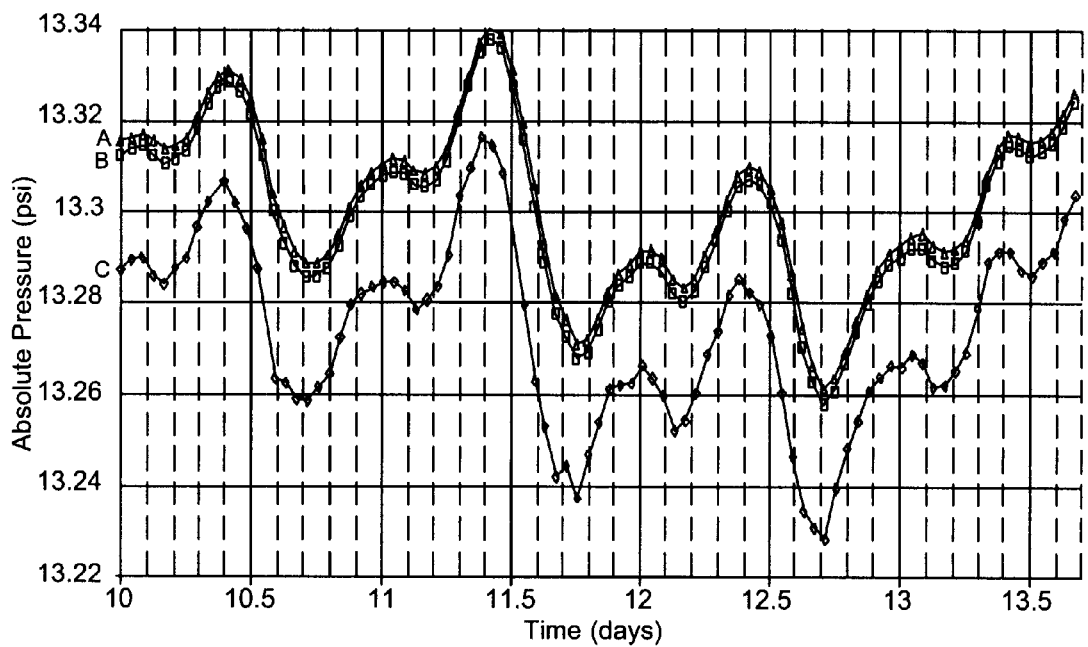
FIG. 3 is an illustration of data plots that are useful in demonstrating the usefulness of the methodology of the present invention for estimating landfill gas generation rate.

FIG. 3 is taken from a simulation of the methodology of the present invention, with pressures B taken at a depth of 30 feet and pressures A taken at a depth of 60 feet in the center of the landfill. The simulation shows pressure lag and amplitude attenuation which were found to increase with decreasing cap permeability, and to be accentuated by the presence of a liner. In the example illustrated by FIG. 3, there is almost no lag or attenuation between the simulated pressures at 30 foot and 60 foot depths in the landfill because of the high permeability of the landfill materials. The increase in pressure within the landfill relative to atmospheric pressure C is due to the gas source within the landfill and, predominately, to the lower permeability of the landfill cover.

Figure 4:
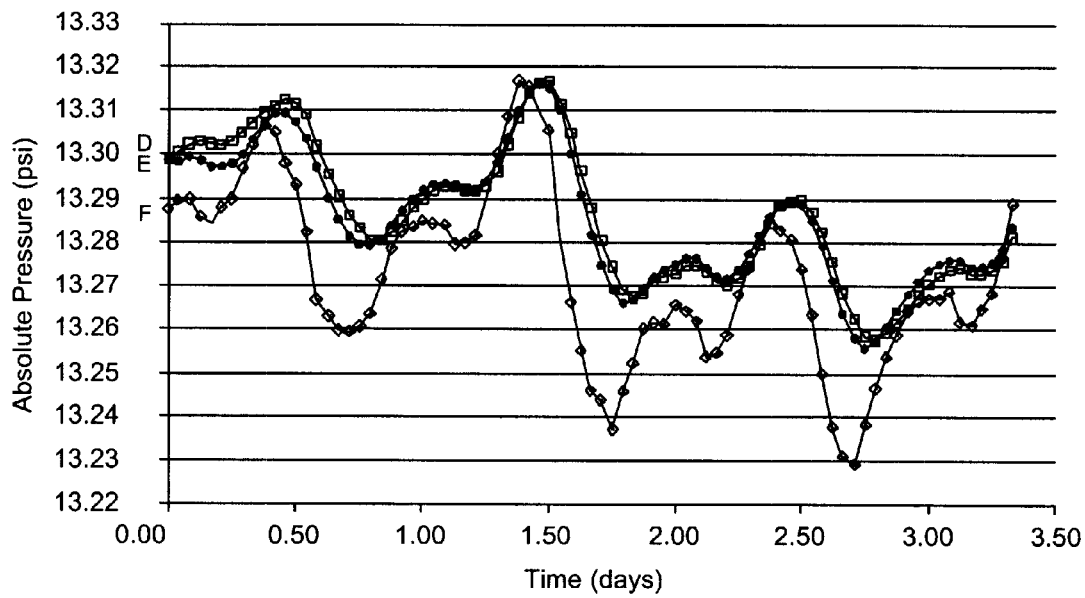
FIG. 4 is a graph illustrating pressure data collected at a landfill in Tucson, Ariz. and the fit to those data of a model simulation of the methodology of the present invention.

FIG. 4 shows the measured atmospheric pressures F at a sensor located on the surface of an unlined, 100-acre landfill in Tucson, Ariz. and measured pressures D at a sensor placed at the surface of the landfill and connected by a tube to a gas-pervious implant placed in the supporting soil 100 feet below the landfill surface. The pressures E were obtained by adjusting vertical gas permeability and landfill gas production in a model simulation of the methodology of the present invention. The landfill refuse porosity was assumed to be 45%, and the gas-filled porosity of the landfill cover and surrounding soils was assumed to be 35%. The vertical gas permeabilities utilized to generate the observed pressures were 1.0 darcy in the land cover, 15 darcies in the landfill refuse, 1.0 darcy in shallow soils, and 1.5 darcies in soils below the landfill. Horizontal soil gas permeabilities were higher by a factor of ten everywhere. The total production of 740 scfm was obtained by summing the amount of LFG exiting the landfill refuse through the landfill cover and through soils underlying and beside the refuse.

While the foregoing discussion relates to estimating the LFG generation rate from a landfill, it will be clear to those skilled in the art that the principles of the present invention can also be used to estimate the permeability of the refuse and cover independent of estimating the LFG gas generation rate. In such a case, the model simulation of the methodology is applied by varying permeability to obtain a match of the change in amplitude and the lag of the pressures measured in the subsurface sensor relative to the pressures measured in the atmospheric sensor. The model used for this purpose would be based on equation 16 with the last term on the righthand side containing the gas generation rate set to zero.

Thus, according to the foregoing disclosure, a method for estimating the gas generation rate of a subsurface body such as a landfill has been described. It will be clear to those skilled in the art that the principles of the present invention can be used to determine the gas generation rate of other subsurface bodies of material where gas is generated from or within the subsurface material. Moreover, it will be clear to those skilled in the art that the principles of the present invention can be used to estimate the permeability of the a portion of a gas generating landfill.

REFERENCES

Al-Hussainy, R., H. J. Ramey, Jr., and P. B. Crawford, 1966. The Flow Of Real Gases Through Porous Media. Journal of Petroleum Technology, Volume 237, pp. 624–636.

Carslaw, H. S. and J. C. Jaeger, 1959. *Conduction of Heat in Solids.* Oxford University Press, Oxford, England.

Hantush, M. S., 1964. Hydraulics of Wells in *Advances in Hydroscience, Volume I,* V. T. Chow Ed., Academic Press, New York.

Lu, N. 1999. Time-series analysis for determining vertical air permeability in unsaturated zone. J. Geotechnical and Environmental Engineering. January. pp. 69–67.

Rojstaczer, S. and J. Turk. 1995. Field-based determinations of air diffusivity using soil air and atmospheric pressure time series. Water Resources Research. Volume 31, 3337–3343.

Weeks, E. P. 1978. Field determination of vertical permeability to air in the unsaturated zone. U.S. Geological Survey Professional Paper 1051.

What is claimed is:

1. A method of estimating the LFG generation rate of a landfill located at a landfill site, comprising the steps of
   a. obtaining a time history record of atmospheric pressure that is representative of atmospheric pressure at a surface boundary of the landfill,
   b. measuring gas pressure at a selected subsurface location at the landfill site over a time period that is included in the time history record of step a, and
   c. using the atmospheric pressure of step a and the measured gas pressure of step b to estimate the LFG generation rate of a portion of the landfill.

2. A method as defined in claim 1, wherein the estimate of the LFG generation rate of a portion of the landfill is determined by a mathematical solution based on the following formula:

$$\nabla \cdot \frac{-\bar{\bar{k}}_e \rho}{\mu}(\nabla P + \rho g \vec{n}) = \phi \frac{\partial \rho}{\partial t} + \rho \dot{Q}$$

where
   $\dot{Q}$ is the volumetric rate of gas generation per unit volume of the porous medium of the portion of the landfill,
   $\underline{\underline{k}}_e$ is the effective gas permeability tensor,
   P is the pressure at a point in the refuse of the portion of the landfill,
   $\nabla$ is the gradient operator,
   $\rho$ is the gas density,
   g is the gravitational acceleration,
   $\phi$ is the gas-filled porosity,
   $\mu$ is the dynamic viscosity of the LFG in the portion of the landfill,
   $\vec{n}$ is the unit normal vector directed downward,
   t is time,
   and the terms $k_e$, $\mu$, and $\rho$ are dependent on the temperature, pressure, and gas composition.

3. A method as set forth in claim 1 wherein the estimate of LFG generation rate of a portion of the landfill is determined by a mathematical solution based on the following formula:

$$\nabla \cdot \frac{-\bar{\bar{k}}_e \rho}{\mu}(\nabla \bar{P} + \rho g \vec{n}) = \phi \frac{\partial \rho}{\partial t} + \rho \dot{Q}$$

where
   $\dot{Q}$ is the volumetric rate of gas generation per unit volume of the porous medium of the portion of the landfill,
   $\underline{\underline{k}}_e$ is the effective gas permeability tensor
   P is the pressure in a point in the refuse of the portion of the landfill,
   $\nabla$ is the gradient operator,
   $\rho$ is the gas density,
   g is the gravitational acceleration,
   $\phi$ is the gas-filled porosity,
   $\mu$ is the dynamic viscosity of gas in the portion of the landfill,
   $\vec{n}$ is the unit normal vector directed downward,
   t is time,
   and any or all of the parameters $k_e$, $\mu$, and $\rho$ are assumed to be constant or independent of temperature, pressure, or gas composition.

4. A method as defined in claim 1, wherein the atmospheric pressure obtained according to step a and the measured subsurface pressure is used in calculations based on the continuity equation and Darcy's Law to produce a gas permeability for the portion of the landfill, and the gas permeability and difference between atmospheric pressure and the measured subsurface pressure are used in a further calculation according to Darcy's law to estimate the gas generation rate for the portion of the landfill.

5. A method as defined in claim 1, wherein the step of using measured gas pressure comprises the step of using the variation in gas pressure at the selected location in the portion of the landfill relative to the variations in atmospheric pressure at the boundary of the portion of the landfill to estimate both the effective gas permeability and the gas generation rate of the portion of the landfill.

6. A method as set forth in claim 1 wherein the landfill includes a top soil cover and a body of landfilled material that generates gas disposed below the top soil cover, and wherein the pressure measurements of step b are taken in the body of landfilled material that generates gas.

7. A method as set forth in claim 1, wherein the step of measuring gas pressure comprises gas pressure at a plurality of subsurface locations at the landfill site, at least one of those subsurface locations being in the body of landfilled material that generates gas.

8. A method as set forth in claim 7, wherein the landfill site includes a body of soil that supports the body of landfilled material that generates gas, and at least one of the subsurface locations is provided in the body of soil.

9. A method as set forth in claim 1, wherein the landfill site includes a body of landfilled material that generates gas and a body of soil that supports the body of landfilled material, and the step of measuring gas pressure comprises measuring gas pressure at least at one selected location in the body of soil.

10. A method of estimating the gas generation rate in a subsurface body of material located at a site, comprising the steps of
    a. obtaining a time history record of atmospheric pressure that is representative of atmospheric pressure at a surface boundary of the subsurface body of material,
    b. measuring gas pressure at a selected subsurface location at the site of the subsurface body of material over a time period that is included in the time history record of step a, and
    c. using the atmospheric pressure of step a and the measured gas pressure of step b to estimate the gas generation rate of a portion of the subsurface body of material.

11. A method as defined in claim 10, wherein the estimate of the gas generation rate of the subsurface body of material is determined by a mathematical solution based on the following formula:

$$\nabla \cdot \frac{-\bar{\bar{k}}_e \rho}{\mu}(\nabla \bar{P} + \rho g \vec{n}) = \phi \frac{\partial \rho}{\partial t} + \rho \dot{Q}$$

where
   $\dot{Q}$ is the volumetric rate of gas generation per unit volume of the porous medium of the subsurface body of material,
   $\underline{\underline{k}}_e$ is the effective gas permeability tensor,
   P is the pressure in a point in the subsurface body of material,
   $\nabla$ is the gradient operator,
   $\rho$ is the gas density, g is the gravitational acceleration, φ is the gas-filled porosity, μ is the dynamic viscosity of gas in the subsurface body of material $\vec{n}$ is the unit normal vector directed downward, t is time, and the terms $k_e$, μ, and ρ are dependent on the temperature, pressure, and gas composition.

12. A method as set forth in claim 10, wherein the estimate of the gas generation rate of the subsurface body of material is determined by a mathematical solution based on the following formula:

$$\nabla \cdot \frac{-\bar{\bar{k}}_e \rho}{\mu}(\nabla P + \rho g \vec{n}) = \phi \frac{\partial \rho}{\partial t} + \rho \dot{Q}$$

where $\dot{Q}$ is the volumetric rate of gas generation per unit volume of the porous medium of the subsurface body of material, $\underline{k}_e$ is the effective gas permeability tensor, P is the pressure in a point in the subsurface body of material, ∇ is the gradient operator, ρ is the gas density, g is the gravitational acceleration, φ is the gas-filled porosity, μ is the dynamic viscosity of gas in the subsurface body of material, $\vec{n}$ is the unit normal vector directed downward, t is time, and wherein any or all of the parameters $k_e$, μ, and ρ are assumed to be constant or independent of temperature, pressure, or gas composition.

13. A method as defined in claim 10, wherein the atmospheric pressure obtained according to step a and the measured subsurface pressure is used in calculations based on the continuity equation and Darcy's Law to produce a gas permeability for the subsurface body of material, and the gas permeability and difference between atmospheric pressure and measured subsurface pressure are used in a further calculation according to Darcy's law to estimate the gas generation rate for the subsurface body of material.

14. A method as defined in claim 10, wherein the step of using measured gas pressure comprises using the differences in gas pressure at the selected location in the subsurface body of material relative to the atmospheric pressure at the boundary of the subsurface body of material to estimate both the effective gas permeability and the gas generation rate of a portion of the subsurface body of material.

15. A method as set forth in claim 10, wherein pressure measurements of step b are taken at a plurality of selected locations in the subsurface body of material.

16. A method of estimating the landfill gas permeability of a portion of a gas generating landfill, comprising the steps of
a. obtaining a time history record of atmospheric pressure that is representative of atmospheric pressure at a surface boundary of the landfill,
b. measuring gas pressure at a selected subsurface location in the landfill over a time period that is included in the time history record of step a, and
c. using the atmospheric pressure of step a and the measured gas pressure of step b to estimate the gas permeability of a portion of the gas generating landfill.

17. A method as set forth in claim 16, wherein the atmospheric pressure obtained according to step a and the measured subsurface pressure is used in the following calculation based on the continuity equation and Darcy's Law to produce a gas permeability distribution for a portion of the gas generating landfill:

$$\nabla \cdot \frac{-\bar{\bar{k}}_e \rho}{\mu}(\nabla P + \rho g \vec{n}) = \phi \frac{\partial \rho}{\partial t}$$

where $\underline{k}_e$ is the effective gas permeability tensor,

P is the pressure at a point in the refuse of the portion of the landfill,

∇ is the gradient operator,

ρ is the gas density, g is the gravitational acceleration,

φ is the gas-filled porosity,

μ is the dynamic viscosity of the portion of the landfill, $\vec{n}$ is the unit normal vector directed downward, t is time, and the terms $k_e$, μ, and ρ are dependent on the temperature, pressure, and gas composition.

18. A method as set forth in claim 16, wherein the atmospheric pressure obtained according to step a and the measured subsurface pressure is used in the following calculation based on the continuity equation and Darcy's Law to produce a gas permeability distribution for a portion of the gas generating landfill:

$$\nabla \cdot \frac{-\bar{\bar{k}}_e \rho}{\mu}(\nabla P + \rho g \vec{n}) = \phi \frac{\partial \rho}{\partial t}$$

where $\underline{k}_e$ is the effective gas permeability tensor,

P is the pressure at a point in the refuse of the portion of the landfill,

∇ is the gradient operator,

ρ is the gas density, g is the gravitational acceleration,

φ is the gas-filled porosity,

μ is the dynamic viscosity of the portion of the landfill, $\vec{n}$ is the unit normal vector directed downward, t is time, and wherein any or all of the parameters $k_e$, μ, and ρ are assumed to be constant or independent of temperature, pressure, or gas composition.

19. A method as defined in claim 16, wherein the atmospheric pressure obtained according to step a and the measured subsurface pressure is used in calculations based on the continuity equation and Darcy's Law to produce a gas permeability for the portion of the gas generating landfill.

20. A method as set forth in claim 19, wherein the gas generating landfill comprises a top soil cover and a body of landfilled material that generates gas disposed below the top soil cover, and wherein the step of measuring gas pressure comprises measuring gas pressure at a plurality of locations in the body of landfilled material that generates gas.

* * * * *